US007966034B2

(12) United States Patent
Northcutt et al.

(10) Patent No.: US 7,966,034 B2
(45) Date of Patent: Jun. 21, 2011

(54) METHOD AND APPARATUS OF SYNCHRONIZING COMPLEMENTARY MULTI-MEDIA EFFECTS IN A WIRELESS COMMUNICATION DEVICE

(75) Inventors: John W. Northcutt, Chapel Hill, NC (US); Charles Randall Yates, Fuquay-Varina, NC (US); Robert A. Zak, Apex, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 2100 days.

(21) Appl. No.: 10/674,780

(22) Filed: Sep. 30, 2003

(65) Prior Publication Data

US 2005/0070241 A1     Mar. 31, 2005

(51) Int. Cl.
*H04M 1/00*     (2006.01)
(52) U.S. Cl. ............... 455/550.1; 455/567; 455/3.01; 379/374.01; 379/374.03
(58) Field of Classification Search ............ 455/265, 455/567, 566, 414.1, 415, 412.2, 550.1, 563, 455/3.06, 424, 425, 456.5, 456.6, 575.1, 455/67.7, 561, 569.1, 157.2, 159.1, 159.2, 455/156.1, 76, 405, 414.4, 556.1, 556.2, 455/557; 379/373.04, 373.03, 374.03, 375.01, 379/376.01, 68, 72, 179, 207.16, 211.03, 379/252, 418, 374.1, 347.03, 88.13; 84/603, 84/645, 616, 640, 636; 700/90; 715/716, 715/500.1
See application file for complete search history.

(56) References Cited

U.S. PATENT DOCUMENTS

| 5,763,802 | A | * | 6/1998 | Aoki et al. ................. 84/613 |
| 5,911,129 | A | * | 6/1999 | Towell ..................... 704/270.1 |
| 6,094,587 | A | * | 7/2000 | Armanto et al. ............ 455/567 |
| 6,177,623 | B1 | | 1/2001 | Ooseki |
| 6,278,884 | B1 | * | 8/2001 | Kim ........................ 455/556.1 |
| 6,597,928 | B2 | * | 7/2003 | Ito ............................. 455/567 |
| 6,639,649 | B2 | * | 10/2003 | Fredlund et al. ............. 352/12 |
| 6,800,799 | B2 | * | 10/2004 | Fujiwara et al. ............ 84/645 |
| 6,963,761 | B2 | | 11/2005 | Hayashi |
| 2001/0014616 | A1 | * | 8/2001 | Matsuda et al. ............. 455/567 |
| 2001/0023197 | A1 | * | 9/2001 | Shibata ...................... 455/567 |

(Continued)

FOREIGN PATENT DOCUMENTS

EP     0795845     9/1997

(Continued)

OTHER PUBLICATIONS

"Beatnik Inc. Enhanced Audio Solutions Home Page," http://www.beatnik.com. printed Sep. 30, 2003, 1 page.

(Continued)

*Primary Examiner* — Duc M Nguyen
*Assistant Examiner* — Charles Chow
(74) *Attorney, Agent, or Firm* — Coats & Bennett, P.L.L.C.

(57) ABSTRACT

A mobile communications device has a wireless transceiver to facilitate communications, memory, and a processor. The processor may be configured to analyze an audio file stored in the memory, and extract or generate synchronizing information from the audio file. The processor synchronizes one or more complementary multi-media effects, such as lights, a camera, or a tactile feedback generator, with the audio file based on the synchronizing information. Alternatively, a user may input synchronizing information about the audio file via an interface on the communications device. The processor may then control the complementary multi-media effects in synchronization with the input synchronizing information.

12 Claims, 7 Drawing Sheets

U.S. PATENT DOCUMENTS

| | | | |
|---|---|---|---|
| 2002/0025838 A1 | 2/2002 | Kawamura | |
| 2002/0038157 A1* | 3/2002 | Dowling et al. | 700/90 |
| 2002/0142810 A1* | 10/2002 | Kawasaki et al. | 455/566 |
| 2003/0017808 A1* | 1/2003 | Adams | 455/76 |
| 2003/0045274 A1* | 3/2003 | Nishitani | 455/414 |
| 2004/0067751 A1* | 4/2004 | Vandermeijden et al. | 455/414.1 |
| 2004/0139842 A1* | 7/2004 | Brenner et al. | 84/477 R |
| 2005/0190199 A1* | 9/2005 | Brown et al. | 345/600 |
| 2006/0259862 A1* | 11/2006 | Adams et al. | 715/716 |
| 2009/0097823 A1* | 4/2009 | Bhadkamkar et al. | 386/96 |

FOREIGN PATENT DOCUMENTS

| | | |
|---|---|---|
| GB | 2 369 219 | 5/2002 |
| GB | 2 380 908 | 4/2003 |
| GB | 2380908 A * | 4/2003 |
| JP | 10319980 | 12/1998 |
| JP | 11112615 | 4/1999 |
| JP | 2000059837 | 2/2000 |
| JP | 2000250534 | 9/2000 |
| JP | 2001237929 | 8/2001 |
| JP | 2002027028 | 1/2002 |
| JP | 2002135366 | 5/2002 |
| JP | 2002141974 | 5/2002 |
| JP | 2002159066 | 5/2002 |
| JP | 2002252676 | 9/2002 |
| JP | 2002297134 | 10/2002 |
| JP | 2003060739 | 2/2003 |

OTHER PUBLICATIONS

"Beatnik Audio Engine™ White Paper," http://www.beatnik.com/pdf.files/bae_whitepaper.pdf, printed Sep. 30, 2003, 6 pages.

"Beatnik mobileBAE™ Datasheet," http://www.beatnik.com/pdf.files/mobilebae.datasheet.pdf, printed Sep. 30, 2003, 2 pages.

http://www.beatnik.com/.

* cited by examiner

METHOD AND APPARATUS OF SYNCHRONIZING COMPLEMENTARY MULTI-MEDIA EFFECTS IN A WIRELESS COMMUNICATION DEVICE

BACKGROUND

The present invention relates generally to wireless communications devices, and more particularly to controlling complementary multi-media effects associated with the wireless communications devices.

Wireless communication devices typically generate a ring signal to announce events, such as an incoming call. Most modern wireless communication devices can store a plurality of ring signals and the user selects a ring signal or ring signals according to the user's taste. These ring signals may comprise simple tones, but more frequently comprises a sequence of tones forming a melody. A number of melodic ring signals are typically preloaded by the manufacturer into device memory as audio files. Some mobile communication devices also permit users to download ring signals from a website. There are also software packages available that allow a user to create original ring signals. Some mobile communication devices include music composition functionality and an input interface that allow the user to create his or her own ring signals with the mobile communication device itself. The ability to change or create custom ring signals is a common feature that is desired by most consumers.

Synchronizing multi-media effects, such as vibrations and flashing lights, during the playback of ring signals is known. To date, however, synchronized multi-media effects have been programmed by the manufacturer for manufacturer-installed ring signals. There is currently no way for a user to associate or synchronize such multi-media effects with ring signals that are downloaded from a website or created by the user. The present invention addresses these shortcomings.

SUMMARY

In one embodiment of the present invention, a wireless communications device, for example, a cellular telephone or a Personal Digital Assistant (PDA), comprises a wireless transceiver to communicate with other users in a communications network, a memory, a user interface, and a processor. The processor is configured to analyze an audio file stored in the memory, extract or generate synchronizing information from the audio file, and associate one or more complementary multi-media effects with the audio file based on the synchronizing information. Alternatively, a user of the device may enter information about the audio file manually via the interface. Using the information, the processor controls the one or more multi-media effects in synchronization with the audio file.

DETAILED DESCRIPTION

Figure 1:
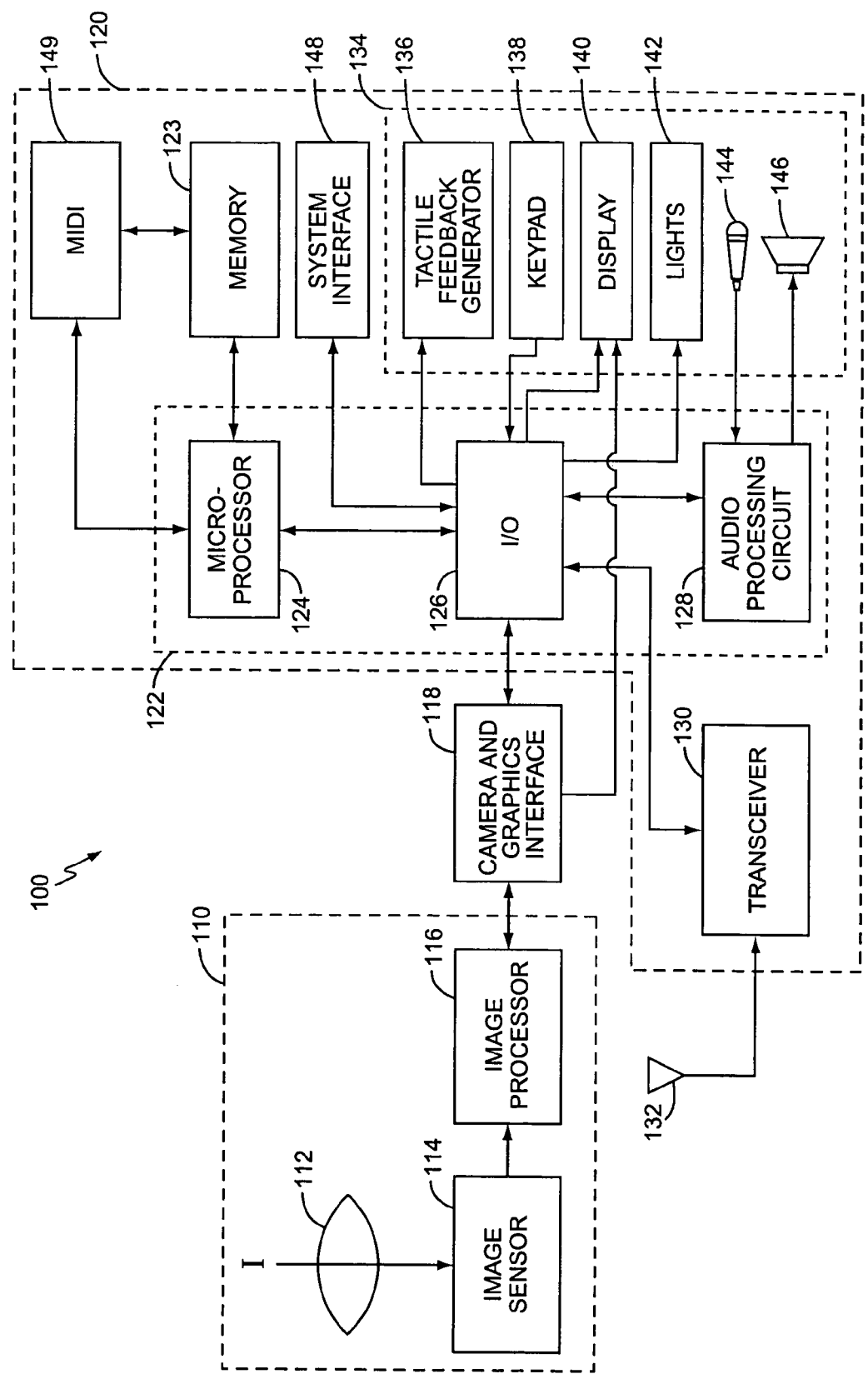
FIG. 1 is a block diagram of an exemplary wireless communication device according to one embodiment of the present invention.

Referring now to FIG. 1, a block diagram of an exemplary wireless communication device according to the present invention is shown therein and indicated generally by the number 100. Device 100 comprises a camera assembly 110, camera and graphics interface 118, and a communication circuit 120.

Camera assembly 110 includes a lens assembly 112 comprising one or more lenses to collect and focus light onto an image sensor 114. The image sensor 114 may be any conventional image sensor, such as a charge-coupled device (CCD) or a complementary metal oxide semiconductor (CMOS) image sensor, and captures images formed by the light collected and focused by lens assembly 112. An image processor 116 processes raw image data captured by image sensor 114 for subsequent storage in memory, output to a display, and/or transmission to a remote station. Camera and graphics interface 118 interfaces image processor 116 with communication circuit 120 and user interface 134 according to any method known in the art.

Communication circuit 120 comprises an input/output circuit 126 that interfaces microprocessor 124 with camera and graphics interface 118, transceiver 130, audio processing circuit 128, and user interface 134. Microprocessor 124 may be implemented as one or more microprocessors, and further, may be any suitable processor known in the art. This includes general purpose and special purpose microprocessors, as well as digital signal processors (DSPs). Microprocessor 124 controls the operation of device 100 according to programs stored in memory 123, and as described later in more detail, generates control signals to control one or more complementary multi-media features, such as camera assembly 110, lights 142, and tactile feedback generator 136.

Memory 123 represents the entire hierarchy of memory in device 100, and may include both random access memory (RAM) and read-only memory (ROM). Computer program instructions and data required for operation of device 100 are stored in non-volatile memory, such a EPROM, EEPROM, and/or flash memory, which may be implemented as discrete devices, stacked devices, or integrated with microprocessor 124. Memory 123 may also store one or more audio files downloaded during manufacture or by the user. These audio files may correspond to one or more ring tones selectable by the user, and may be synthesized for playback to the user by a Musical Instrument Digital Interface (MIDI) synthesizer 149. Microprocessor 124, input/output circuit 126, audio processing circuit 128, and/or memory 123 may be incorporated into a specially designed application-specific integrated circuit (ASIC) 122.

Figure 2:
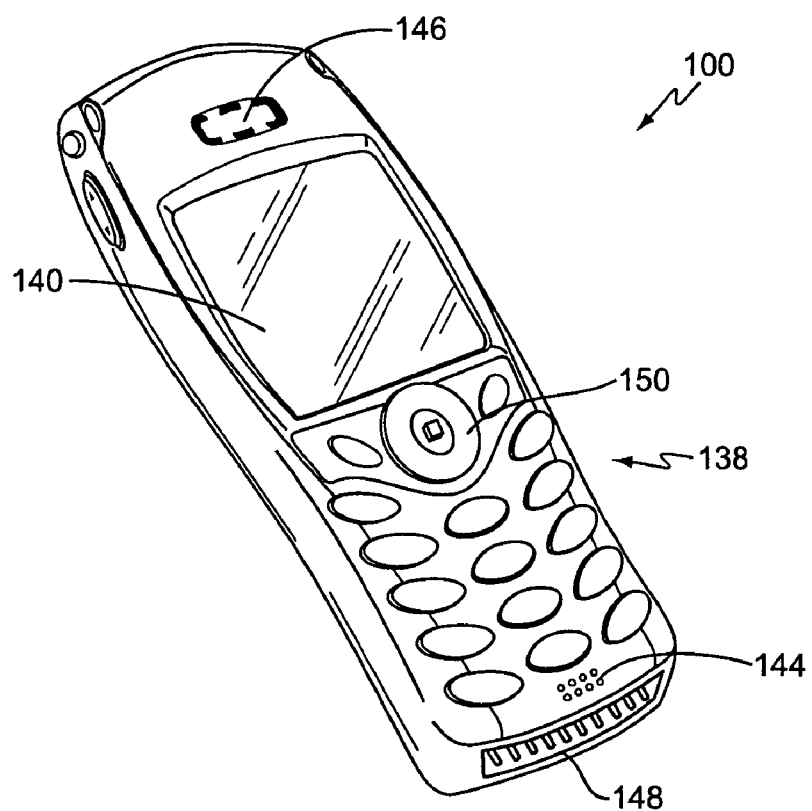
FIG. 2 is a perspective view of the front of an exemplary mobile telephone according to one embodiment of the present invention.

User interface 134 includes a system interface 148, tactile feedback generator 136, keypad 138, display 140, lights 142, microphone 144, and speaker 146. Keypad 138 includes an alphanumeric keypad, and optionally, other navigation controls such as joystick control 150 (FIG. 2). Keypad 138 and joystick control 150 allow the operator to dial numbers, enter commands, and select options from various menus. Display 140 allows the operator to see dialed digits, images, video sequences, call status information, menu options, and other service information.

Microphone 144 converts the user's speech into electrical audio signals and speaker 146 converts audio signals into audible signals that can be heard by the user. Audio processing circuit 128 provides basic analog output signals to speaker 146 and accepts analog audio inputs from microphone 144. Transceiver 130 is coupled to an antenna 132 for receiving and transmitting signals, and is a fully functional cellular radio transceiver that operates according to standards well known in the art, including Global System for Mobile Communications (GSM), TIA/EIA-136, cdmaOne, cdma2000, UMTS, and Wideband CDMA.

Tactile feedback generator 136, which may comprise a vibrator, generates tactile signals that can be sensed by the user. Lights 142, which may comprise backlighting for a keyboard or display or LED indicators, provide a visual signal to the user. As will be hereinafter described, microprocessor 124 controls the tactile feedback generator 136 and/or lights 142 during playback of ring signals to produce synchronized multi-media effects.

A system interface 148 facilitates inter-connection of device 100 with external hardware devices, such as a charging cradle, an external computing device, or a digital video camera. Through system interface 148, users may charge the battery of device 100, exchange data with external devices, or download audio files corresponding to ring tones from an external computing device. As will be described later in more detail, the present invention may control an external device connected to system interface 148, such as a camera flash, a camera, or other external device, according to information associated with the audio file.

Figure 3:
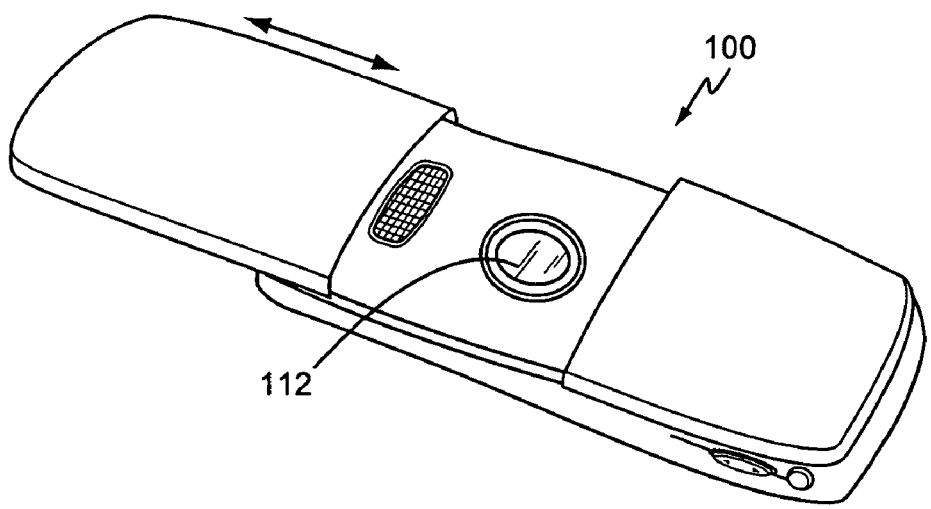
FIG. 3 is a perspective view of the rear of an exemplary mobile telephone according to one embodiment of the present invention.

FIGS. 2 and 3 illustrate the physical appearance of an exemplary mobile communication device 100 according to the present invention. This embodiment comprises a cellular telephone with an integrated camera. The keypad 138 and display 140 are disposed on a front face of the device 100. The back includes a sliding panel that conceals the camera lens 112. When used in camera mode, the display 140 may act as a viewfinder for the user to view an image prior to taking its picture, or to view one or more images already stored in memory 123. While the disclosed embodiment is a cellular telephone, the present invention is not so limited. It should be understood that device 100 might include satellite telephones; personal communication services (PCS) devices, personal data assistants (PDAs), palm-top computers, and the like.

The mobile communications device 100 synchronizes the operation of one or more complementary multi-media effects with the playback of an audio file, for example, a MIDI file. These files may include information that can be used to synchronize the one or more multi-media effects with the audio file during playback. The information carried in the files may be information regarding a note to be played, when to change tones, volume, various instruments and/or sounds to be played or synthesized, and how long to sustain a given note. Additionally, these files may or may not include timing information, or may contain timing information that is incorrect. For example, some MIDI files that do not contain timing information default to a 4/4 time signature during playback. This default time signature, however, does not always match the actual timing of the audio file. An accurate time signature needs to be determined to permit a realistic synchronization of the multi-media effects with the audio file. Microprocessor 124 analyzes these audio files and extracts or generates synchronizing information that can be used to synchronize multi-media effects with the audio file.

In a relatively simple embodiment, the microprocessor 124 may control the tactile feedback generator 136 and lights 142 to activate and deactivate synchronously with the playback of ring signals and other audio files. That is, the microprocessor 124 may cause the lights 142 or tactile feedback generator 136 to pulse in rhythm with the ring signal or audio file. In a more sophisticated example, the tactile feedback generator 136 may be controlled to pulse in place of (or in addition to) a particular instrument, such as a snare drum whenever the information calls for a snare drum to play. In other embodiments, the microprocessor 124 may also control camera assembly 110 to take pictures synchronously with the beat of the ring signal or audio file. In still other embodiments, the microprocessor 124 may control the display to playback a video sequence or animation in synchronization with the ring signal or audio file (e.g., a ball that bounces at the bottom of the display on the downbeat). For example, consider a video sequence comprised of 20 frames displayed in sequence every 50 ms synchronized with an audio file having a downbeat every second. According to the present invention, microprocessor 124 would extract this information and calculate the cycle time to display the sequence as 1 sec (20 frames×50 ms.=1000 ms.=1 sec.). Microprocessor 124 then generates a control signal every second (i.e., every 20 frames) to ensure that the start of the frame sequence appears in a desired part of the display on every second, and intermediate control signals that display the remaining frames accordingly. Of course, if the downbeat occurs faster or slower than once every second, then microprocessor 124 would adjust the frame rate accordingly.

Figure 4A:
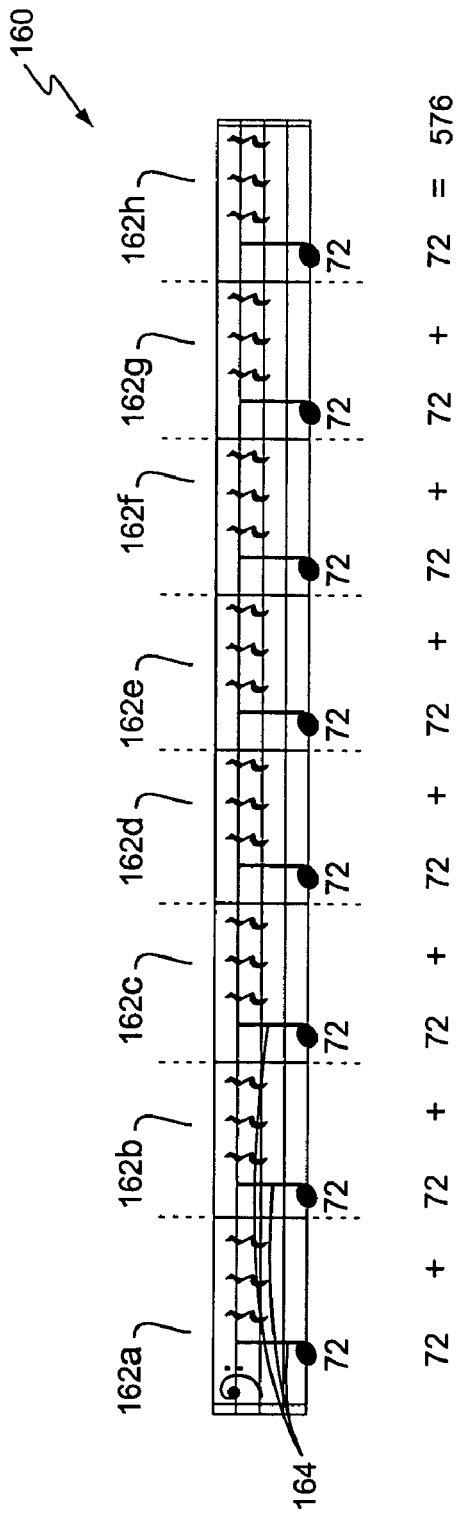
FIGS. 4A and 4B illustrate one method of extracting information from an audio file according to one embodiment of the present invention.
Figure 4B:
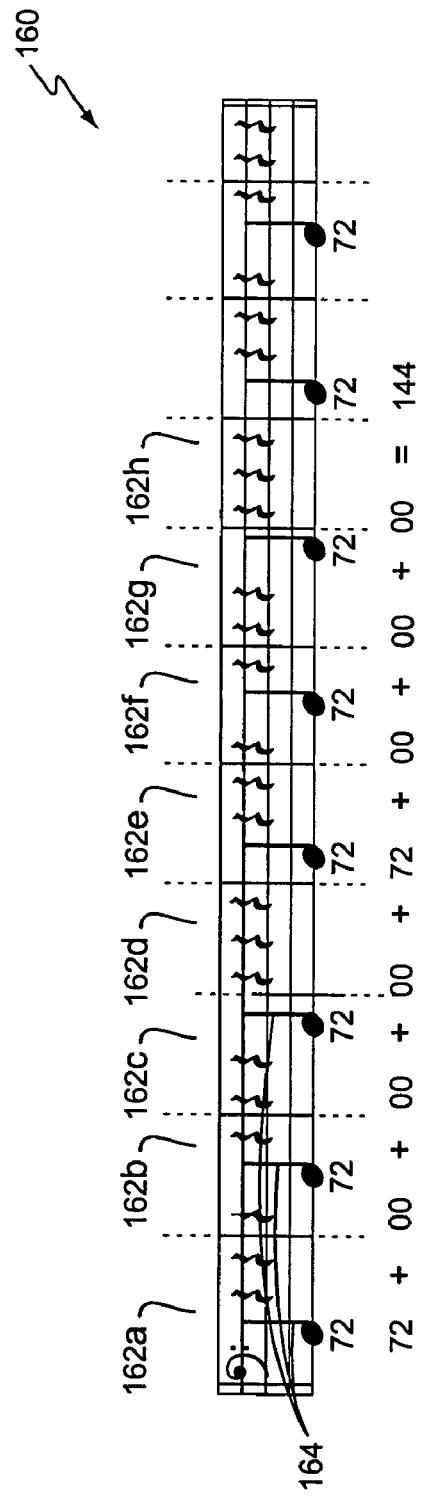

As stated above, the microprocessor 124 may analyze the audio file to determine an accurate time signature. In one embodiment, shown in FIGS. 4A-4B, microprocessor 124 analyzes a sample 160 by selecting the sample 160 from the beginning of the track in the SMF file, and analyzing it to determine timing information. In FIGS. 4A-4B, sample 160 represents that of a bass drum track in an SMF (Standard MIDI Format) file. However, those skilled in the art will readily appreciate that sample 160 may represent any track in the SMF file, including tracks of other instruments, such as the piano or guitar.

Microprocessor 124 reads the header of the SMF file to determine the units of time per quarter note (i.e., ticks per quarter note). The ticks, along with an assumed time signature (i.e., a candidate time signature), permit the sectioning of a sample 160 into a plurality of measures 162a-162h. Each measure 162a-162h has an equal number of notes determined by the candidate time signature. In FIG. 4A, the candidate time signature is 4/4 time, and the number of ticks per quarter note extracted from the header is 1000. Thus, each measure 162a-162h contains 4 notes, and spans 4000 ticks. Once sectioned, microprocessor 124 then analyzes sample 160. Each time a quarter note 164 occurs on the first beat of each measure 162a-162h, the velocity parameter of the corresponding note-on event is summed to calculate a weight value. In the example of FIG. 4A, the velocity parameter of the note-on event is 72. Thus, microprocessor 124 would calculate the weight value as 72+72+72+72+72+72+72+72=576.

Next, microprocessor 124 repeats this process using a different candidate time signature. As seen in FIG. 4B, the candidate signature is ¾ time, and therefore, each measure 162a-162h in FIG. 4B contains 3 notes per measure and spans 3000 ticks. Microprocessor 124 again analyzes each measure 162a-162h in sample 160 to determine if a quarter note 164 occurs within the first beat of each measure 162a-162h according to the new candidate time signature. In FIG. 4B, quarter note 164 only falls on the first beat of measures 162a and 162e. As such, microprocessor 124 only sums the velocity parameters of the corresponding note-on event for these two quarter notes 164 to calculate a second weighted value of 72+72=144. Those quarter notes 164 that do not occur on the first of every measure 164 are ignored.

This process may be repeated using as many additional candidate time signatures as desired. The calculated weight values are compared, and the highest value determines the most likely time signature. In FIGS. 4A-4B, the first value of 576 is greater than the second value of 144. Thus, it can be determined that sample 160, and the music represented in the SMF file, is most likely 4/4 time. The SMF file can then be overwritten to include the timing information, or the timing information placed in a new file and associated with the analyzed SMF file.

To ensure a fair comparison of different candidate time signatures, microprocessor 124 normalizes sample 160 by limiting it to a fixed number of measures. Thus, the number of measures 162a-162h analyzed by microprocessor 124 for each candidate time signature is equivalent. Maximizing the number of measures that will be analyzed produces a time signature estimate having a high degree of confidence. By way of example, one embodiment calculates the number of measures to be analyzed using the formula:

$$\text{floor}\left(\frac{M}{N \times T}\right)$$

where M is the duration of the entire SMF file in ticks, N is the maximum number of notes per measure along all candidate time signatures, and T is the number of ticks per quarter note.

The present invention may detect note-on events that occur anywhere within the first quarter note, including those that occur within only a fraction of the ticks that define the beat. For example, consider measure 162a in FIG. 4A where instead of quarter note 164, two sixteenth notes occur in quick succession on the first beat. In this case, microprocessor 124 may look for a corresponding note-on event having an event time that is within the first one-fourth of the quarter note. Using the above-example of 1000 ticks per quarter note, the event time would be in the range of 0 and 249 ticks. Microprocessor 124 would then sum only the velocity parameter for this note-on event, and ignore the note-on event corresponding to the other sixteenth note.

The preceding embodiments determined the time signature of the SMF file by examining the first beat of each measure 162a-162h over a plurality of candidate time signatures. However, the first beat of the file will not necessarily fall on the first beat of the measure. For example, the old song "It's a Sin to Tell a Lie" has a ¾ time signature and the melody line starts on the third beat of the measure, not the first. Another example might be a song that begins with the melody (i.e., a song that has no introductory portion). To address situations such as these, the embodiments illustrated in FIGS. 4A-4B may be extended.

By way of example, consider a time signature of n/m (n beats per measure with a 1/m note getting one beat). Further, denote the beats of the measure as 0, 1 . . . n-1. Therefore, a measure of a song with a ¾ time signature would contain beats 0, 1, and 2. Additionally, a time signature phase is defined to be the beat number of the first beat within an SMF file. Thus, the song "It's a Sin to Tell a Lie," having a ¾ time signature and a melody line that starts on the third beat of the measure, would have a time signature phase of 2, while a song having a ¾ time signature and a melody line that starts on the second beat of the measure, would have a time signature phase of 1.

The time signature detection procedure described in FIGS. 4A and 4B assumes a time signature phase of 0, and runs once for each candidate time signature i. This yields a single summed weight value $\sigma_i$ for each candidate time signature. However, the procedure can be expanded to detect the time signature phase at the same time it detects the time signature, and thus, calculate a more accurate estimate of the time signature of the file. More particularly, instead of running the procedure once for each candidate time signature i, $n_i/m_i$, iterate through the procedure $n_i$ times for each candidate time signature. For example, the procedure begins assuming a candidate time signature phase of 0, and calculates a summed weight value $\sigma_i(0)$. Then, the procedure repeats itself assuming a candidate time signature phase of 1, and calculates a summed weight value $\sigma_i(1)$. The iterations end with candidate time signature phase of $n_i-1$ to calculate a summed weight value $\sigma_i(n_i-1)$. The process is then repeated for each candidate time signature. In this way, the $i^{th}$ candidate time signature will result in $n_i$ summed weight values, $\sigma_i(0)$ to $\sigma_i(n_i-1)$, one summed weight value for each candidate time signature phase.

To illustrate this method, consider the example song "It's a Sin to Tell a Lie." As stated above, this song has a ¾ time signature, and a time signature phase of 2. In this case, i=0 (the first candidate time signature), $n_0=3$, and $m_0=4$. Running the procedure produces 3 summed values, $\sigma_0(0)$, $\sigma_0(1)$, and $\sigma_0(2)$ corresponding to the $n_0=3$ candidate time signature phases in the measure. The highest summed weight value is kept, and the others discarded. For the next candidate time signature of 4/4, the procedure will produce 4 summed values $\sigma_1(0)$, $\sigma_1(1)$, $\sigma_1(2)$, and $\sigma_1(3)$ corresponding to the $n_0=4$ candidate time signature phases in the measure. This process continues for as many candidate time signatures as desired. Once all the summed weights values for the candidate time signature phases of all candidate time signatures have been computed, the procedure selects the largest summed weight value $\sigma_j(l)$, and reports j as the correct time signature, and l as the correct time signature phase.

Figure 5:
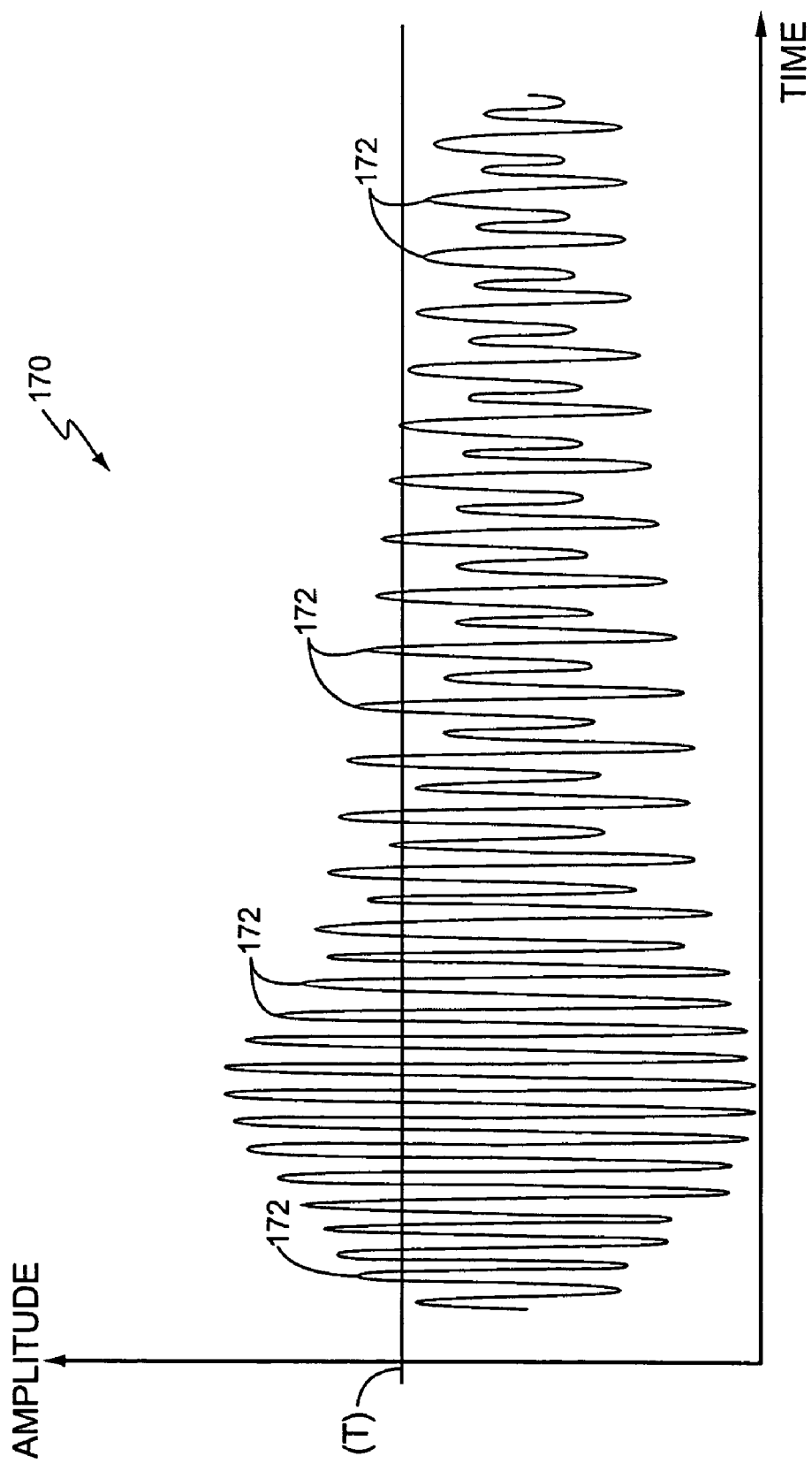
FIG. 5 illustrates an alternate method of extracting information from an audio file according to one embodiment of the present invention.

FIG. 5 illustrates an alternate method in which microprocessor 124 or other processing circuitry automatically determines and extracts timing information for associating multimedia effects with the audio file. In this example, microprocessor 124 analyzes a synthesized output signal 170 of MIDI synthesizer 149 to detect amplitude peaks 172. When peaks 172 are detected, they are compared to a threshold value (T). If they exceed the threshold value (T), microprocessor 124 generates a control signal to activate/deactivate the appropriate multi-media effect. Further, microprocessor 124 continues to generate the control signal, or alternatively does not deactivate the multi-media effect, so long as peaks 172 remain above the threshold (T). Thus, tactile feedback generator 136, for example, may be controlled to activate for variable lengths of time according to the setting of the threshold value (T) and the detected peaks 172 of the analyzed signal 170. Alternatively, microprocessor 124 may calculate the duration of time in which the activation of one or more multi-media effects are sustained, and/or vary their intensity based on the amount in which the detected peak 172 exceeds the threshold (T). The threshold value (T) may be fixed or variable, or may be adaptive during playback of the audio file. For example, the value of threshold (T) may be responsive to the volume control on device 100. Additionally, more than one threshold value may be used for comparison with detected peaks 172.

In another embodiment, microprocessor 124 samples the synthesizer output, and generates a control signal responsive to the detection of the note-on event carried in the MIDI file. Software controlling the MIDI synthesizer 149 could also recognize or detect this information, and signal the microprocessor 124 to generate the appropriate control signals. For example, some audio files may carry information regarding various instrument types, such as drums, guitars, timpani, and cymbals, or sounds including handclaps, and gunshots. The software controlling the MIDI synthesizer 149 would signal microprocessor 124 each time one or more of the instruments and/or sounds occur. Microprocessor 124 would then generate one or more control signals accordingly.

To compensate for messaging and signaling delay in device 100, the MIDI synthesizer 149, the microprocessor 124, and/or other processing circuitry may be associated with circuitry that delays the playback of the audio file to the user and/or the generation of the control signals. One such example would be an equalization filter or compression circuitry. The delay would permit adequate time for the microprocessor 124 to control one or more multi-media effects before the audio is actually rendered to the user. This would appear to the user as more accurate synchronization between the one or more multi-media effects and the audio rendered through the speaker 146.

Figure 6:
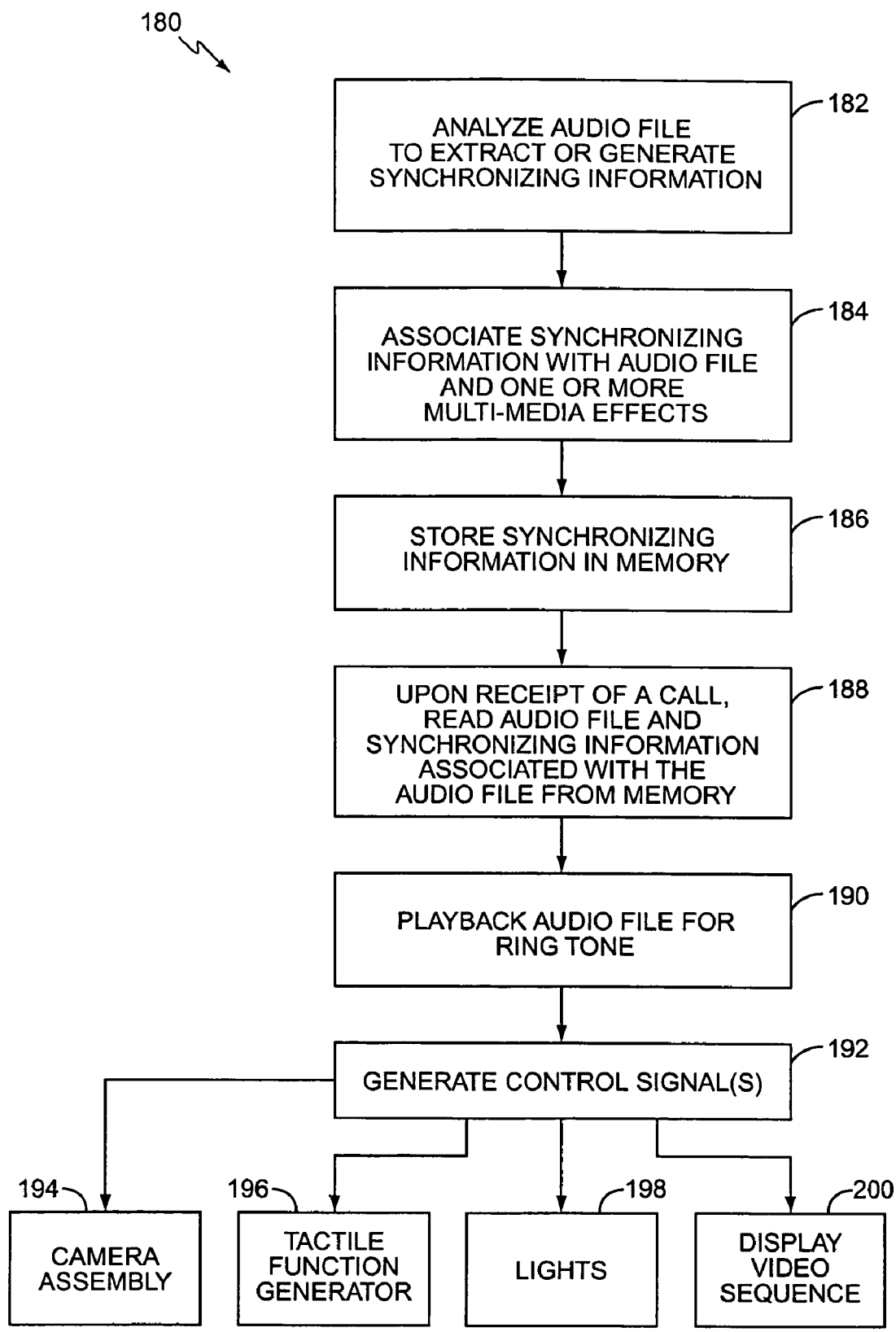
FIG. 6 illustrates one method of extracting information from an audio file according to one embodiment of the present invention.

FIG. 6 is a flow chart that illustrates one exemplary method 180 wherein one or more multi-media events are synchronized with the playback of an audio file. FIG. 6 illustrates the audio file as a ring signal played responsive to an incoming call. However, it should be understood that the present invention is not so limited. For example, other embodiments may play the audio file as an alarm, or during the play of a game. The audio file may have already been stored in memory 123 by the manufacturer, or may have been created by the user, or downloaded from an external website.

The audio file is analyzed to extract synchronizing information that will be used to synchronize the one or more multi-media effects with the audio file (block 182). The synchronizing information may already be included in the audio file. However, some or all of the synchronizing information may be missing from the file, or may be incorrect. Thus, device 100 may analyze the audio file generate the synchronizing information automatically. Once extracted or generated, the synchronizing information is associated with the audio file and one or more multi-media effects (block 184). The information may be written directly into the audio file and stored in memory 123, or it may be stored as a separate file in memory 123 (block 186).

Upon receipt of an incoming call (block 188), the microprocessor 124 reads the audio file, and the synchronizing information associated with the audio file, from memory 123. Microprocessor 124 controls audio processing circuit 128 to playback the audio file through speaker 146 (block 190), and generates control signals (block 192). The control signals may be generated at various intervals and durations corresponding to the associated synchronizing information. The generated control signals are then sent to camera assembly 110 (block 194), tactile feedback generator 136 (block 196), lights 142 (block 198), and/or display 140 (block 200) to control the one or more multi-media effects in synchronization with the audio file as it is played back to the user. In one embodiment, the control signal is sent to an external device via system interface 148, such as an external camera (not shown), to control the camera flash, or to take pictures in time to the audio file, for example. Yet another embodiment controls one or more multi-media effects on an external PDA or other computing device.

Figure 7:
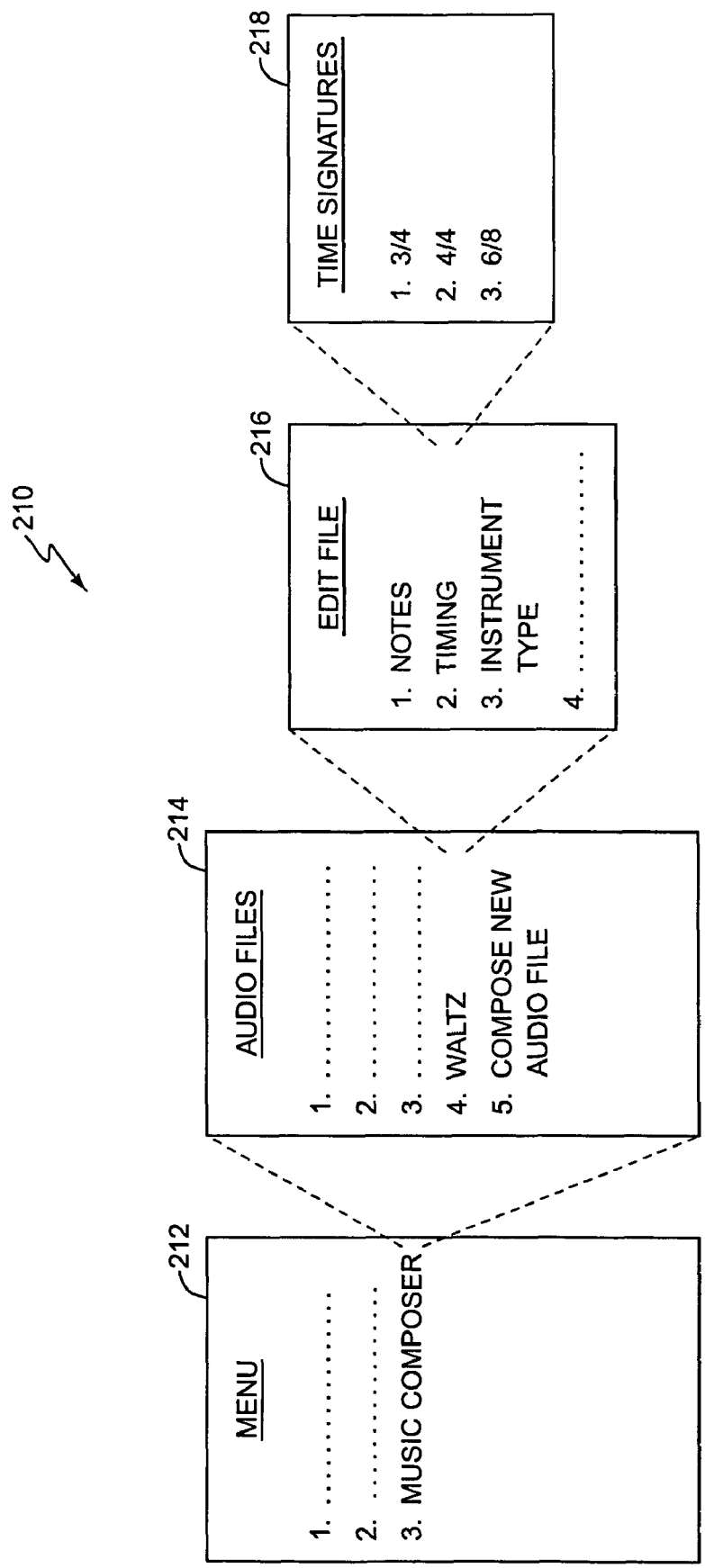
FIG. 7 illustrates one exemplary menu system according to one embodiment of the present invention.

Alternatively, a user of device 100 may manually input synchronizing information. As shown in FIG. 7, the user may navigate a series of menus 210 to select a specific timing signature for the audio file. Those skilled in the art will realize that the present invention is in no way limited to the menus and/or options shown in the figures, but instead, are merely for illustrative purposes. The user accesses the main menu 212 and selects the "Music Composer" option. This leads to an audio file menu 214 that lists one or more audio files already stored in memory 123, or allows the user to create a new composition. For illustrative purposes, "Waltz" is already stored in memory and the user merely selects this option. This selection invokes an edit file menu 216, in which the user may select "Timing" to define the timing signature for the selected audio file. The user is then presented with a list of possible timing signatures on the timing signature menu 218. In this example, the possible selections are 3/4, 4/4, and 6/8 time, however, other timing signatures may also be used. Once selected, the timing information may be written directly to the audio file, or stored separately as stated above.

Figure 8:
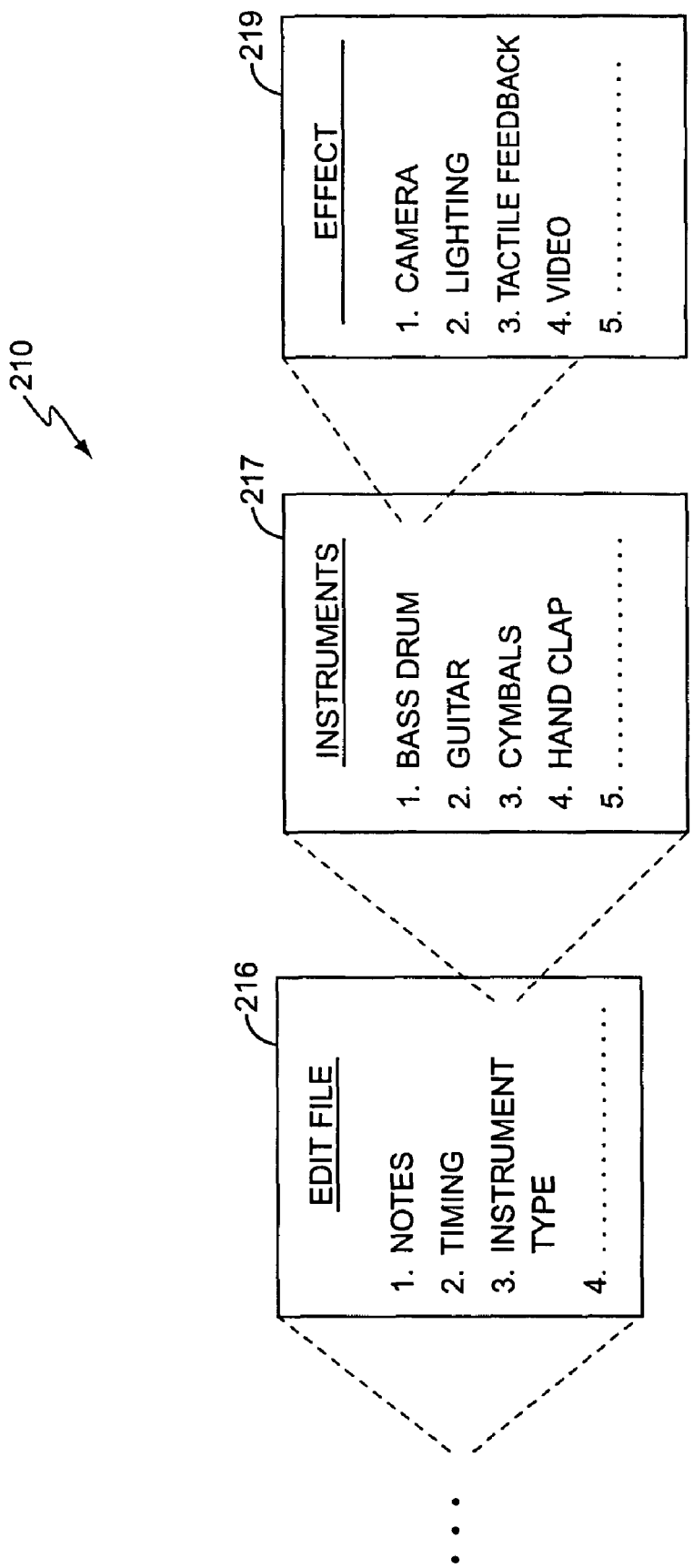
FIG. 8 illustrates an alternate menu system according to one embodiment of the present invention.

Additionally, the user may manually define various instrument types or sounds to be associated with the one or more multi-media effects. As shown in FIG. 8, the user navigates to the edit file menu 216, and selects the "Instrument Type" option to invoke the instruments menu 217. The user may select one or more of the instruments or sounds listed on the instrument menu 217 to invoke the effects menu 219. The effects menu 219 lists the various multi-media effects that are available in device 100, and permits the user to manually associate a chosen multi-media effect with the selected instrument or sound. For example, the user may associate a "Bass Drum" on menu 217 with the "Tactile Feedback" function on menu 219. Whenever microprocessor 124 encounters a note-on event for a bass drum during the playback of the audio file, it generates a control signal to the tactile feedback generator 136 to activate/deactivate accordingly. Alternatively, the menus 217 and 219 may be reversed to permit the user to associate a selected multi-media effect with one or more available instruments.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of synchronizing one or more complementary multi-media effects with an audio file in a mobile communications device, the method comprising:
   selecting a sample from an audio file stored in memory in a mobile communications device;
   analyzing said sample to calculate synchronizing information by:
   sectioning said sample into a plurality of measures, each said measure comprising an equivalent number of notes;
   determining the notes that occur within a desired beat in each said measure; and calculating a weight value by summing a velocity parameter of a corresponding note-on event for each said note that occurs within said desired beat in each said measure; and generating a pattern in which to render one or more complementary multi-media effects in the mobile communications device synchronously with the playback of the audio file based on the calculated synchronizing information.

2. The method of claim 1 wherein analyzing said sample to calculate synchronizing information further comprises sampling the output of a MIDI synthesizer in the mobile communications device.

3. The method of claim 2 wherein analyzing said sample to calculate synchronizing information further comprises detecting a peak amplitude within said sample.

4. The method of claim 3 further comprising comparing said detected peak amplitude to a threshold value.

5. The method of claim 4 wherein synchronizing the one or more complementary multi-media effects with the audio file comprises generating a control signal based on the comparison of said detected peak amplitude and said threshold value.

6. The method of claim 4 wherein synchronizing the one or more multi-media effects with the audio file varying the intensity of the one or more complementary multi-media effects based on the comparison of said detected peak amplitude and said threshold value.

7. The method of claim 4 wherein synchronizing the one or more complementary multi-media effects comprises varying the duration of activation of the one or more complementary multi-media effects based on the comparison of said detected peak amplitude and said threshold value.

8. The method of claim 1 further comprising overwriting selected information in the audio file with the synchronizing information.

9. The method of claim 1 further comprising storing the synchronizing information in memory of the mobile communications device.

10. A method of synchronizing one or more complementary multi-media effects with an audio file in a mobile communications device, the method comprising:

selecting a sample from an audio file stored in memory in a mobile communications device;

analyzing said sample to calculate synchronizing information by calculating a first value and a second value based on a first candidate time signature and a second candidate time signature, respectively; and generating a pattern in which to render one or more complementary multi-media effects in the mobile communications device synchronously with the playback of the audio file based on the calculated synchronizing information.

11. The method of claim 10 wherein analyzing said sample to calculate synchronizing information further comprises selecting the highest value from said first and second values to select a time signature.

12. The method of claim 11 wherein synchronizing the one or more complementary multi-media effects with the audio file comprises associating said selected time signature with the audio file.

\* \* \* \* \*